United States Patent
Kullen et al.

(10) Patent No.: US 7,735,835 B2
(45) Date of Patent: Jun. 15, 2010

(54) SEALING ARRANGEMENT

(75) Inventors: Wilhelm Kullen, Hülben (DE); Wolfgang Eben, Münsingen/Apfelstetten (DE); Wolfgang Gebhardt, Hülben (DE); Hansjürgen Mattheis, Blaubeuren (DE); Martin Kehr, Bad Urach (DE)

(73) Assignee: ElringKlinger AG, Dettingen/Erms (DE)

( * ) Notice: Subject to any disclaimer, the term of this patent is extended or adjusted under 35 U.S.C. 154(b) by 181 days.

(21) Appl. No.: 11/902,958

(22) Filed: Sep. 26, 2007

(65) Prior Publication Data

US 2008/0073858 A1 Mar. 27, 2008

(30) Foreign Application Priority Data

Sep. 27, 2006 (DE) ................. 10 2006 045 587

(51) Int. Cl.
*F16J 15/02* (2006.01)
(52) U.S. Cl. ............................... 277/598; 277/644
(58) Field of Classification Search ......... 277/592–598, 277/644
See application file for complete search history.

(56) References Cited

U.S. PATENT DOCUMENTS

| | | | |
|---|---|---|---|
| 1,847,729 A | | 3/1932 | Shaw |
| 6,015,152 A | * | 1/2000 | Swensen et al. ............ 277/321 |
| 6,189,895 B1 | * | 2/2001 | Yamada ..................... 277/591 |
| 6,845,984 B2 | * | 1/2005 | Doyle ....................... 277/317 |
| 7,100,925 B2 | * | 9/2006 | Swensen et al. ............ 277/644 |
| 2004/0232625 A1 | | 11/2004 | Kerchner et al. |
| 2005/0166584 A1 | | 8/2005 | Kerchner et al. |
| 2006/0103079 A1 | | 5/2006 | Diez |

FOREIGN PATENT DOCUMENTS

| | | |
|---|---|---|
| DE | 1 961 237 | 7/1970 |
| DE | 33 46 490 | 7/1985 |
| DE | 35 09 136 | 9/1986 |
| EP | 0 654 626 A1 | 5/1995 |
| EP | 1 028 277 | 11/2003 |
| JP | 06-094136 A | 4/1994 |
| WO | WO 2005/054723 | 6/2005 |
| WO | WO 2005/085685 A1 | 9/2005 |

* cited by examiner

*Primary Examiner*—Vishal Patel
(74) *Attorney, Agent, or Firm*—Roylance, Abrams, Berdo & Goodman, L.L.P.

(57) ABSTRACT

In a sealing arrangement, in particular for the connection of a manifold to a cylinder head of an internal combustion engine, a flat support (1, 3) has at least one sealing element in the form of a ring element (17) that forms a mold seal. The support (1, 3) and ring element (17) form a unit that holds the ring element captively on the support (1, 3).

11 Claims, 2 Drawing Sheets

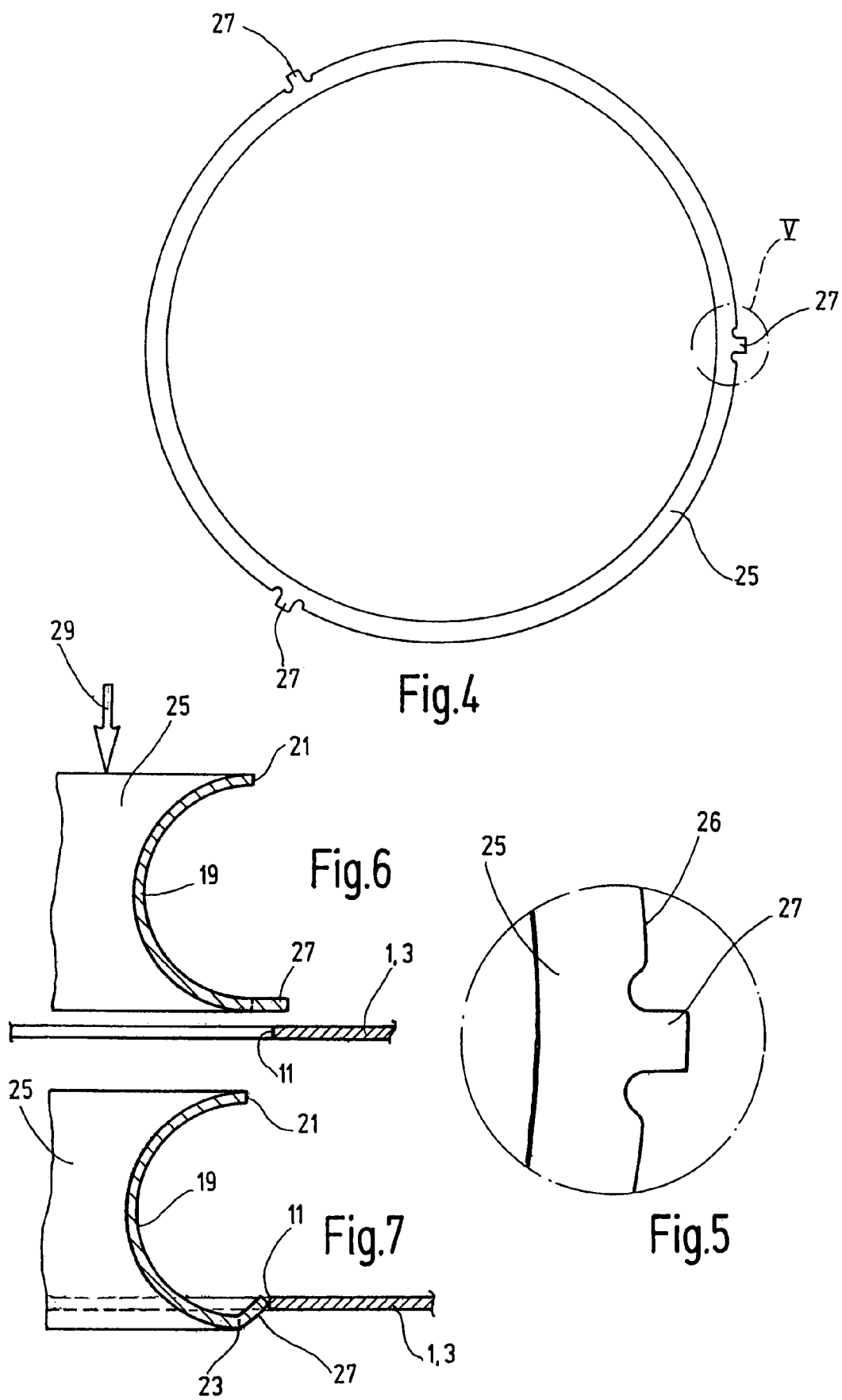

SEALING ARRANGEMENT

FIELD OF THE INVENTION

The present invention relates to a sealing arrangement, in particular for the connection of a manifold to a cylinder head of an internal combustion engine, with a flat support and at least one sealing element in the form of a ring element forming a mold seal.

BACKGROUND OF THE INVENTION

Sealing arrangements of this type are widely used for the connection of exhaust-gas-carrying pipes to cylinder heads of internal combustion engines. Based on the high exhaust gas temperatures that occur, both flat supports of the sealing arrangement and the respective ring element are metallic components with smaller wall thickness in each case. The ring element usually has a profiled configuration.

In a disadvantageous way, the assembly process of such multi-part sealing arrangements is configured in a comparatively complicated manner. During production of the connection with the cylinder head, care must be taken that the ring element is actually present and correctly positioned between the respective connecting parts.

SUMMARY OF THE INVENTION

An object of the present invention is to provide a sealing arrangement, particularly for the connection of a manifold to a cylinder head of an internal combustion engine, in which the assembly process can be performed comparatively more simply and more safely.

According to the present invention, this object is basically achieved by a sealing arrangement forming a unit that captively contains the ring element. The entire operating sequence is configured in an especially simple and safe manner during use since neither during the supply of the sealing arrangements in the actual assembly position, which takes place in an automated fashion in industrial manufacturing, nor in the actual connecting process must it be ensured whether or not the ring element is present and correctly positioned.

In advantageous embodiments in which the support has a flat plate with at least one opening for a gas flow, preferably an exhaust gas flow, the ring element extends along the edge of the respective opening.

Preferably, the ring element that forms the mold seal has the shape of a C-profile opening radially outwardly and raising from the plane of the plate. The arrangement can be designed such that the end area of the C-profile adjacent to the plane of the plate forms a slight curvature on the side of the plate that is set against the end of the C-profile that is raised from the plane.

In an especially advantageous way, the ring element is formed by the edge of the opening that is integral with the plate and that is raised from the plane of the plate. The ring element or elements therefore forms/form an integral component of the plate.

In the production of such embodiments, the procedure may be that by piercing the plate, first the opening or openings is/are formed. The respective opening edge is then raised and is thereafter turned over outward by applying pressing force to form the C-profile. In such a pressing or molding process, the lower end area of the C-profile interconnecting with the plate can form a slight curvature on the side of the plate opposite the end of the C-profile and raised from the plane. Such examples are characterized by an especially good sealing action.

When the ring element does not form any integral component of the plate, but rather is a separate component, the arrangement can be designed such that a holding device produces a frictional connection between plate and ring element and is provided to secure the ring element captively to the plate.

In advantageous embodiments, retaining collars project slightly radially outward and are molded onto the edge of the C-profile opposite the edge of the ring element raised from the plane of the plate. The projections flexibly deform radially inward in the plate's respective opening when the ring element is attached, thereby creating a frictional connection. The effect of this deforming is to generate a holding force.

In the way conventional in sealing arrangements for the connection of exhaust gas manifolds, the plate can have several openings, arranged at a distance from one another, for the passage of a respective exhaust gas flow. For example, the plate can have the shape of a gland with two plate areas, in which one opening each is provided connected to one another by a plate arm. The plate arm has a smaller width compared to these plate areas.

To promote a thermal decoupling between cylinder head and the hot exhaust gas manifold, the plate preferably has openings divided around the respective openings for gas flows. Round holes or crescent-shaped holes can then be provided that surround the respective openings.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 4 is a top plan view of the ring element, used as a sealing element, of a third exemplary embodiment of the sealing arrangement according to the present invention;

FIG. 5 is a greatly enlarged detail top plan view of the area V in FIG. 4;

FIG. 6 is a partial side elevational view in section of the ring element of FIG. 4, greatly enlarged compared to FIG. 4 with the associated edge section of the opening of a plate, in the condition before attaching the ring element on the plate; and FIG. 7 is a partial side elevational view in section corresponding to FIG. 6, with the ring element shown after the plate is inserted into the opening.

DETAILED DESCRIPTION OF THE INVENTION

Figure 3:
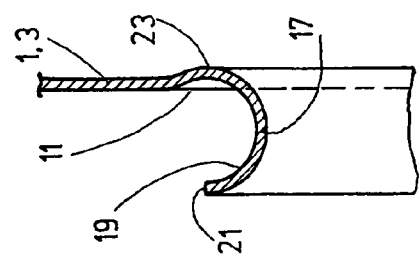
FIG. 3 is a partial side elevational view in section with the area III in FIG. 2 depicted greatly enlarged.

The present invention will be explained in greater detail below on the basis of examples, in which the sealing arrangement has the shape of a gland. A flat metal plate forms the support of the sealing arrangement and has two plate areas 1 and 3 integrally connected together via a comparatively narrow plate arm 5. The arm 5 connects the central areas of the plate areas 1 and 3 to one another and extends along the longitudinal axis 7 of the sealing arrangement. About the center 9 of the circle located on the longitudinal axis 7, there is a circular opening 11 for the passage of an exhaust gas flow emerging from a respective exhaust opening of a cylinder head (not shown), in each plate area 1 and 3. Screw holes 13 are located in two plate areas 1 and 3 for fastening screws attaching the manifold (not shown) and the sealing arrangement to the cylinder head.

Figure 1:
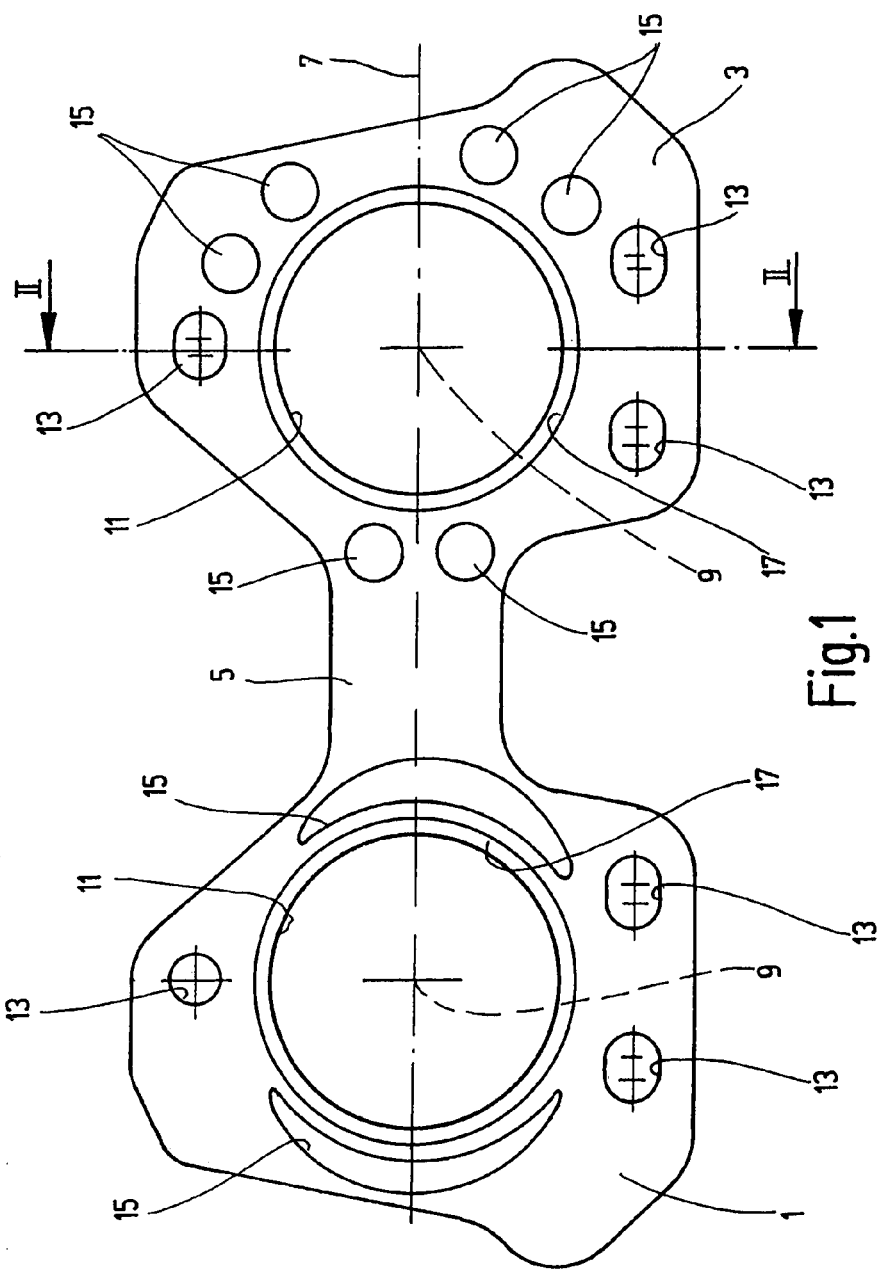
FIG. 1 is top plan view of a sealing arrangement according to first and second exemplary embodiments of the present invention in the form of a gland for use in the attachment connection between an exhaust gas manifold and a cylinder head, with different embodiments being shown on the right side and the left side in the figure, in which differently molded openings for a thermal decoupling are provided.

In addition to the screw holes 13, holes 15 in the plate areas 1 and 3 reduce the heat-conducting surface of the sealing arrangement, and thus, form a thermal decoupling between cylinder head and exhaust gas manifold. In FIG. 1, two different embodiments are illustrated for the holes 15. Specifically, crescent-shaped holes 15 are provided in the plate area 1 on the left, while holes 15 in the form of round holes are provided in the plate area 3 on the right.

Figure 2:
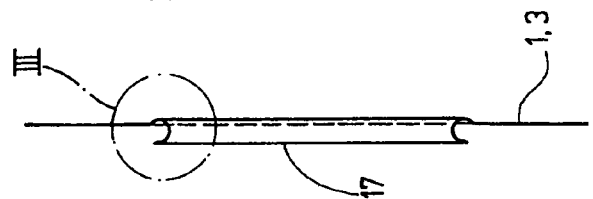
FIG. 2 is a side elevational view in section taken along line II-II in FIG. 1.

FIGS. 1 to 3 relate to an embodiment in which for each opening 11, a sealing element forming a component of the sealing arrangement is formed by a ring element 17. Ring element 17 is integrally formed with the respective plate area 1 and 3 in each case, such that the opening edge is raised on the respective opening 11 of the opening edge. To form a C-profile 19, the end area of the raised edge is turned radially outward by applying a compressive or pressing force to form the profile shape shown in FIG. 3. By this shaping, a slight curvature 23 is produced on the side of the plate areas 1, 3 opposite the raised end 21 of the C-profile 19. The curvature on this side of the plate areas 1, 3 forms a flat layer crimp that projecting relative to and extending around the latter. The curvature 23 projects by 0.5 to 3, preferably by 1 sheet-metal thickness of the plate relative to the areas 1, 3 thereof.

FIGS. 4 to 7 illustrate another embodiment. Instead of the above-described ring element 17 integral with the respective plate area 1, 3, a separate metal ring element 25 is provided also having the shape of a C-profile 19. As is the case in the plate with the plate areas 1 and 3, the ring element 25 is also a thin-walled metal component whose wall thickness, as is the case with the plate, is, for example, in the range of 0.3 mm. For a captive attachment of the ring element 25 on the respective opening 11 in the associated plate area 1, 3, the ring element 25 has three retaining collars 27 on the profile edge opposite its outer end or edge 21. The retaining collars are distributed uniformly on the periphery of the ring element 25, see FIG. 4. As shown most clearly by the enlarged view of FIG. 5, the retaining collars 27 in (undeformed) initial conditions form claw-like projections that project slightly radially on the respective peripheral edge 26 of the ring element 25.

FIG. 6 shows the initial condition shortly before the application of the ring element 25 on the edge of the opening 11 of the respective plate area 1, 3. The retaining collars 27 extend slightly radially outwardly over or radially outwardly beyond the edge of the opening 11. If the ring element is forced into the opening 11 by applying a compressive force corresponding to the force arrow 29, a flexible deformation of the retaining collars 27 occurs when pressing the ring element into the opening 11, see FIG. 7. A frictional connection acting as a holding force is then produced on the opening 11, by which the ring element 25 is held captively on the opening 11. The free ends of the retaining collars 27 in each case are supported flush with the inside wall or inside edge that delineates the opening 11. Based on the oblique arrangement of the retaining collars 27, the outside corner edges (cf. FIG. 7) of the collars come into linear contact with the inside wall or edge of the opening 11 relative to the plate areas 1, 3. A very high edge pressing force then takes place making it possible to mount the ring element 25 securely in the opening 11 of the plate despite the flexing of the retaining collars 27. The ring element can also be easily detached for repair purposes.

The ring element 25 can be easily replaced with a new part. Additionally, with inclusion of common manufacturing tolerances, the respective retaining collar arrangement of three retaining collars 27 allows a very exact hub centering of the ring element 25 in the opening 11 to effect a reliable sealing system. The retaining collars 27 preferably wind up at a steep oblique angle resting on the external edge of the free opening 11.

The ring element 25 can be slightly deformed in a similar way on its peripheral edge 26 that has the retaining collars 27 by the compressive forces that are exerted when it is depressed, as is shown in FIG. 3 for the ring element 17, where a slight curvature 23 is produced by the compressive force that forms the C-profile 19 below the plate 1, 3. FIG. 7 also shows a corresponding curvature 23 for the ring element 25 on its edge opposite the profile end 21 (peripheral edge 26 in FIG. 5). The respective retaining collar 27 extends from this curvature 23 in an oblique support angle of between 30° to 60°, preferably about 45°, in the inside edge of the opening 11, by which the curvature 23 is supported and is held in its sealing position, to improve the sealing in this respect.

To enhance this supporting action, as FIG. 5 shows, the respective retaining collar 27 in the C-profile 19 is provided on both sides with one recess each. Each recess forms an indentation in the adjacent profile wall to further improve the flexible holding action for the individual retaining collar 27. Moreover, at a buckling point (FIG. 7), the arc-shaped profile 19 shown in cross-section (FIG. 6) undergoes transition into the retaining collar 27 extending at an oblique angle and is straight at this point. The buckling point is arranged in a virtual vertical extension below the free profile end of the C-profile 19 located above it.

The term "sealing ring or mold" also extends to ring embodiments with an oval shape or those with a rectangular design. Preferably, the corners of the rectangle are designed in a rounded way. Other ring forms are possible here. For this purpose, the respective images of the mold or sealing ring preferably follow the respective geometry thereof.

While various embodiments have been chosen to illustrate the invention, it will be understood by those skilled in the art that various changes and modifications can be made therein without departing from the scope of the invention as defined in the appended claims.

What is claimed is:

1. A sealing arrangement for connection of a manifold to a cylinder head of an internal combustion engine, comprising:
   a support plate defining a plane;
   a first opening extending through said support plate;
   a sealing ring element captively held in said opening and on said support plate by a frictional connection between said support plate and said ring element, said ring element having a cross-sectional profile opening radially outwardly relative to a longitudinal axis thereof and terminating at opposite first and second outer peripheral edges, said first outer peripheral edge being raised from said plane of said support plate, said second peripheral edge being offset from said plane of said support plate; and
   retaining collars molded onto and extending radially outwardly from said second outer peripheral edge at an angle of 30° to 60° relative to said longitudinal axis, said collars being flexibly deformed radially inwardly against an inside edge of said opening in said support plate forming said frictional connection and having curvatures at connections thereof to said ring element.

2. A sealing arrangement according to claim 1 wherein said first outer peripheral edge is spaced a greater distance from said support plate than said second outer peripheral edge prior to compression between the manifold and cylinder head.

3. A sealing arrangement according to claim 2 wherein said second outer peripheral edge is nearly coplanar with a surface of said support plate.

4. A sealing arrangement according to claim 1 wherein said cross-sectional profile is C-shaped.

5. A sealing arrangement according to claim 1 wherein said support plate is flat; and
said opening is for exhaust gas flow therethrough.

6. A sealing arrangement according to claim 1 wherein said sealing element is raised from said plane of said support plate.

7. A sealing arrangement according to claim 1 wherein said support plate is at least one second opening therein spaced from said first opening and receives another sealing ring with retaining collars retained in said second opening by a frictional engagement similar to that in said first opening.

8. A sealing arrangement according to claim 7 wherein said support plate comprises a gland with first and second plate areas for said first and second openings, respectively, and with a plate arm connected to said first and second plate areas, said plate arm having a smaller width than widths of said plate areas.

9. A sealing arrangement according to claim 7 wherein said support plate comprises holes distributed around said openings.

10. A sealing arrangement according to claim 9 wherein said holes surround crescent-shaped openings.

11. A sealing arrangement according to claim 1 wherein said angle is about 45°.

* * * * *